US010153579B2

(12) United States Patent
Miura et al.

(10) Patent No.: US 10,153,579 B2
(45) Date of Patent: Dec. 11, 2018

(54) WATERPROOF COMPONENT

(71) Applicant: Yazaki Corporation, Tokyo (JP)

(72) Inventors: Kazunori Miura, Shizuoka (JP);
Kouichi Ohyama, Shizuoka (JP);
Isanori Shimizu, Shizuoka (JP)

(73) Assignee: YAZAKI CORPORATION,
Minato-ku, Tokyo (JP)

(*) Notice: Subject to any disclaimer, the term of this
patent is extended or adjusted under 35
U.S.C. 154(b) by 0 days.

(21) Appl. No.: 15/923,172

(22) Filed: Mar. 16, 2018

(65) Prior Publication Data
US 2018/0277980 A1    Sep. 27, 2018

(30) Foreign Application Priority Data

Mar. 27, 2017  (JP) .................. 2017-061168
Sep. 11, 2017  (JP) .................. 2017-174170

(51) Int. Cl.
*H01R 13/52*   (2006.01)
*H01R 13/627*  (2006.01)

(52) U.S. Cl.
CPC ....... *H01R 13/521* (2013.01); *H01R 13/5213*
(2013.01); *H01R 13/5219* (2013.01); *H01R
13/6273* (2013.01)

(58) Field of Classification Search
CPC ............ H01R 13/5221; H01R 13/5208; H01R
9/2675; H01R 31/02; H01R 9/24; H01R
27/00; H01R 31/06

USPC ........ 439/274, 275, 715, 712, 709, 171, 174
See application file for complete search history.

(56) References Cited

U.S. PATENT DOCUMENTS

| 7,766,682 | B1* | 8/2010 | Larkin ............... H01R 13/567 439/281 |
| 7,938,681 | B2* | 5/2011 | Lee ..................... H01R 13/112 439/582 |
| 8,096,828 | B2* | 1/2012 | Ellis ....................... H01R 4/10 439/578 |
| 9,184,512 | B2* | 11/2015 | Duan ...................... H01R 4/00 |
| 9,692,149 | B2* | 6/2017 | Hashimoto ........... H01R 24/38 |
| 10,038,261 | B2* | 7/2018 | Hashimoto .......... H01R 13/447 |
| 2008/0293275 | A1* | 11/2008 | Osada ................ H01R 13/6273 439/188 |

FOREIGN PATENT DOCUMENTS

JP  2011-129391 A  6/2011

* cited by examiner

*Primary Examiner* — Phuong Chi T Nguyen
(74) *Attorney, Agent, or Firm* — Sughrue Mion, PLLC

(57) ABSTRACT

A waterproof component includes a housing body, a mat seal, and a mat seal cover. A locking claw of the housing body is inserted in an attachment hole of a wall together with an attachment hole insertion portion and has an elastically deformable support wall and a claw portion formed at a tip of the support wall and protruding outward from an outer surface of the support wall. The mat seal cover includes a protection protrusion configured to prevent displacement of the support wall toward a direction other than a direction of an elastic deformation of the support wall for insertion of the claw portion in the attachment hole.

5 Claims, 24 Drawing Sheets

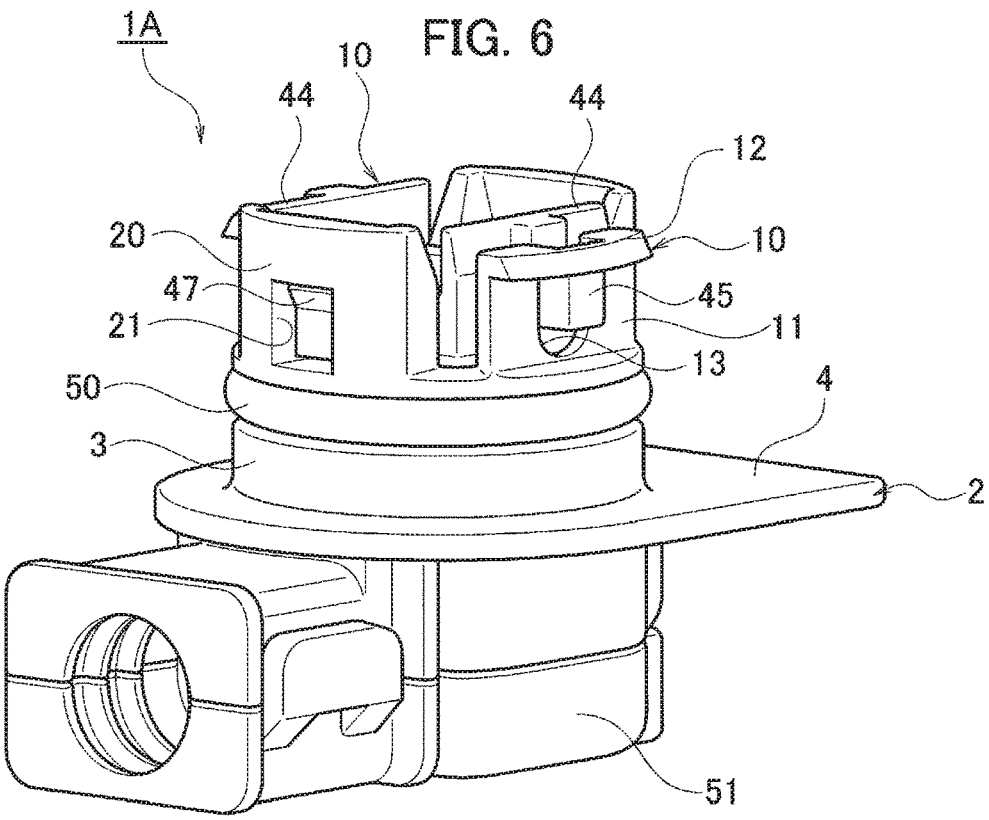
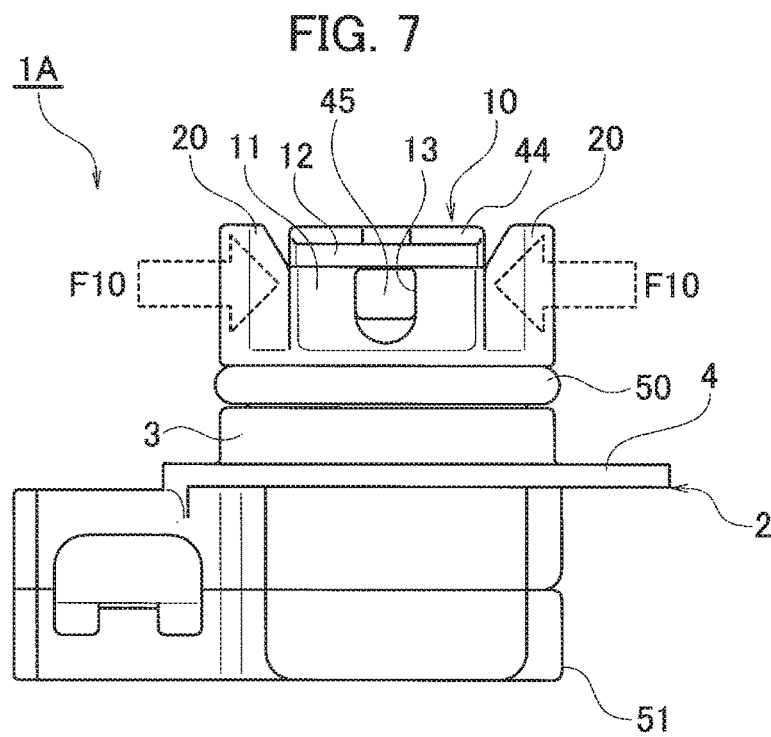

COMPARATIVE EXAMPLE

COMPARATIVE EXAMPLE

COMPARATIVE EXAMPLE

COMPARATIVE EXAMPLE

COMPARATIVE EXAMPLE

COMPARATIVE EXAMPLE

COMPARATIVE EXAMPLE

COMPARATIVE EXAMPLE

COMPARATIVE EXAMPLE

COMPARATIVE EXAMPLE

COMPARATIVE EXAMPLE

COMPARATIVE EXAMPLE

COMPARATIVE EXAMPLE

COMPARATIVE EXAMPLE

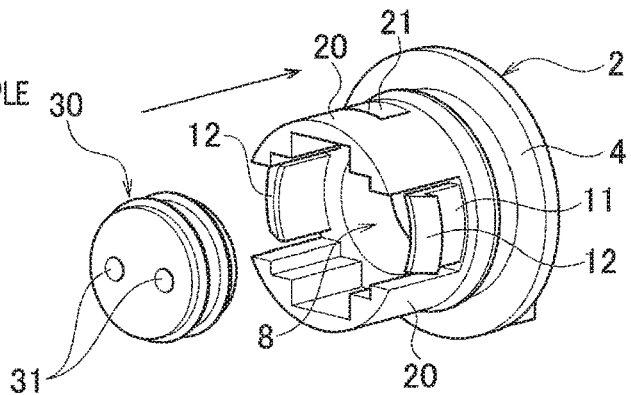
FIG. 25A COMPARATIVE EXAMPLE
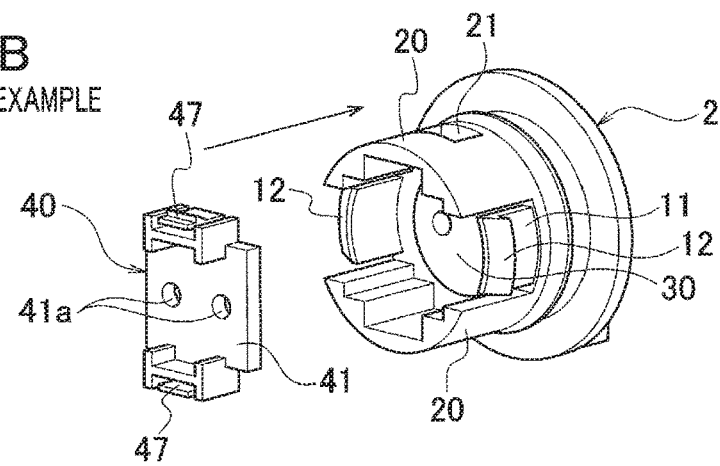
FIG. 25B COMPARATIVE EXAMPLE
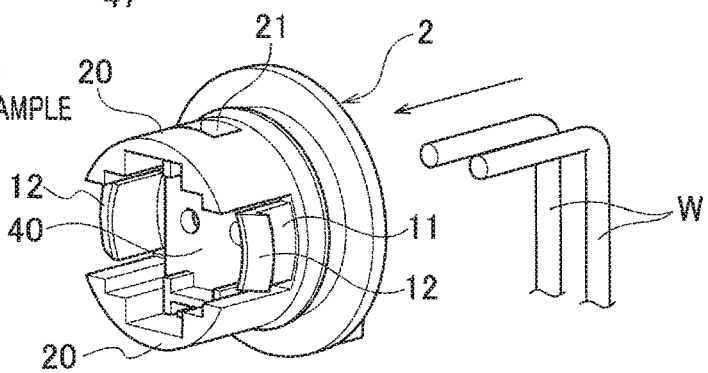
FIG. 25C COMPARATIVE EXAMPLE
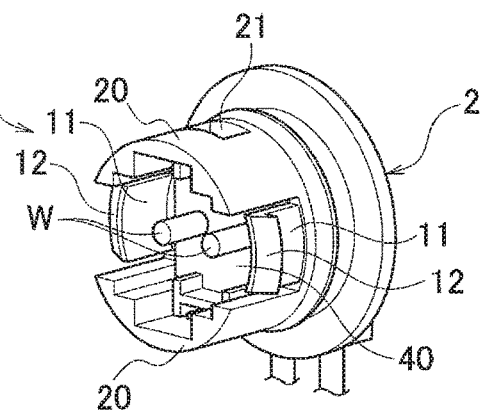
FIG. 25D COMPARATIVE EXAMPLE

COMPARATIVE EXAMPLE

COMPARATIVE EXAMPLE

COMPARATIVE EXAMPLE

WATERPROOF COMPONENT

CROSS REFERENCE TO RELATED APPLICATION

This application is based upon and claims the benefit of priority from the prior Japanese Patent Application Nos. 2017-061168 (filing date: Mar. 27, 2017) and 2017-174170 (filing date: Sep. 11, 2017), the entire contents of which are incorporated herein by reference.

BACKGROUND

1. Technical Field

The disclosure relates to a waterproof component to be attached to an attachment hole of a wall.

2. Related Art

A storage area of control equipment and the like arranged in an engine room of an automobile is needed to be a waterproof area. Therefore, when an electric wire is penetrated through an attachment hole of a vehicle body panel partitioning the wet area and the waterproof area, a waterproof component is attached to the attachment hole of the vehicle body panel to prevent water from entering the waterproof area. Such a waterproof component is proposed in JP 2011-129391 A.

SUMMARY

As shown in FIGS. 1 to 3B, the waterproof component 100 according to the reference example includes: a housing body 101 to be attached to the attachment hole 61 of the wall 60, a mat seal 110 through which the electric wire W penetrates, a mat seal holder 120 for holding the mat seal 110 in the housing body 101, and an elastic ring (O ring) 130 fixed to the housing body 101.

The housing body 101 includes an attachment hole insertion portion 102 to be inserted into the attachment hole 61 of the wall 60. A pair of locking claws 103 and a pair of cover locking portions 104 are provided on the insertion tip side of the attachment hole insertion portion 102. The mat seal holder 120 is provided with a pair of locking claws 121. The pair of locking claws 121 of the mat seal holder 120 are locked to a pair of cover locking portions 104, whereby the mat seal 110 is held by the housing body 101.

When the housing body 101 is inserted into the attachment hole 61 of the wall 60, the pair of locking claws 103 are elastically deformed, and the housing body 101 is attached to the attachment hole 61.

Incidentally, the pair of locking claws 103 are provided in a cantilevered manner on the tip side of the attachment hole insertion portion 102. Therefore, if an external force F20 (FIG. 3B) exceeding the strength of the locking claw 103 itself is applied toward a direction other than a direction of the elastic deformation of the directions of inserting the locking claw 103 into the attachment hole 61, there is a possibility of breakage.

The disclosure is directed to a locking claw waterproof component capable of preventing breakage of a locking claw as much as possible.

A waterproof component in accordance with some embodiments includes a housing body, a mat seal, and a mat seal cover. The housing body is attached to a wall having an attachment hole through which an electric wire penetrates. The housing body includes: an attachment hole insertion portion inserted in the attachment hole and having a mat seal accommodating chamber formed inside the attachment hole insertion portion, the mat seal accommodating chamber having a bottom wall; an abutting portion configured to abut on a first periphery of the attachment hole; a locking claw elastically deformably provided on an insertion tip side of the attachment hole insertion portion, the locking claw inserted in the attachment hole together with the attachment hole insertion portion and locked to a second periphery of the attachment hole opposite to the first periphery; and a cover locking portion provided on the insertion tip side of the attachment hole insertion portion. The mat seal is accommodated in the mat seal accommodating chamber and has an electric wire press-fitting hole through which the electric wire penetrates. The mat seal cover is locked to the cover locking portion. The mat seal cover is configured to sandwich the mat seal with the bottom wall and hold the mat seal in the mat seal accommodating chamber. The locking claw includes: an elastically deformable support wall; and a claw portion formed at a tip of the support wall and protruding outward from an outer surface of the support wall. The mat seal cover includes a protection protrusion configured to prevent displacement of the support wall toward a direction other than a direction of an elastic deformation of the support wall for insertion of the claw portion in the attachment hole.

According to the above configuration, even when an external force exceeding the strength of the locking claw of its own acts on the locking claw, the locking claw protection protrusion prevents the deformation of the locking claw, so that damage to the locking claw can be prevented as much as possible.

BRIEF DESCRIPTION OF DRAWINGS

FIG. 6 is a perspective view of the waterproof component according to the first embodiment.

FIG. 7 is a side view of the waterproof component according to the first embodiment.

FIGS. 25A to 25D are perspective views of the respective assembling steps of the waterproof component according to the second comparative example.

DETAILED DESCRIPTION

Figure 1:
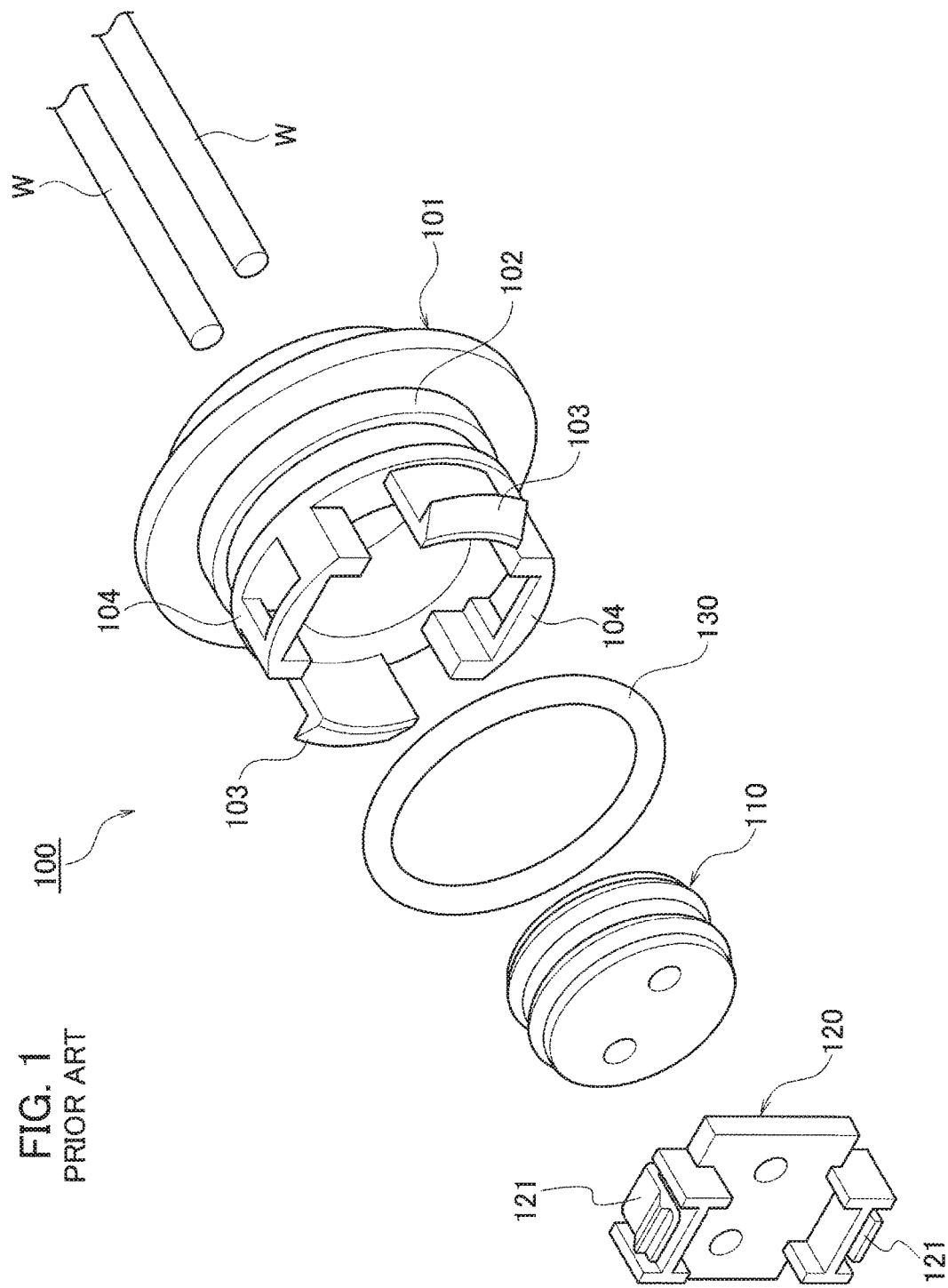
FIG. 1 is an exploded perspective view of a waterproof component according to a reference example.
Figure 2A:
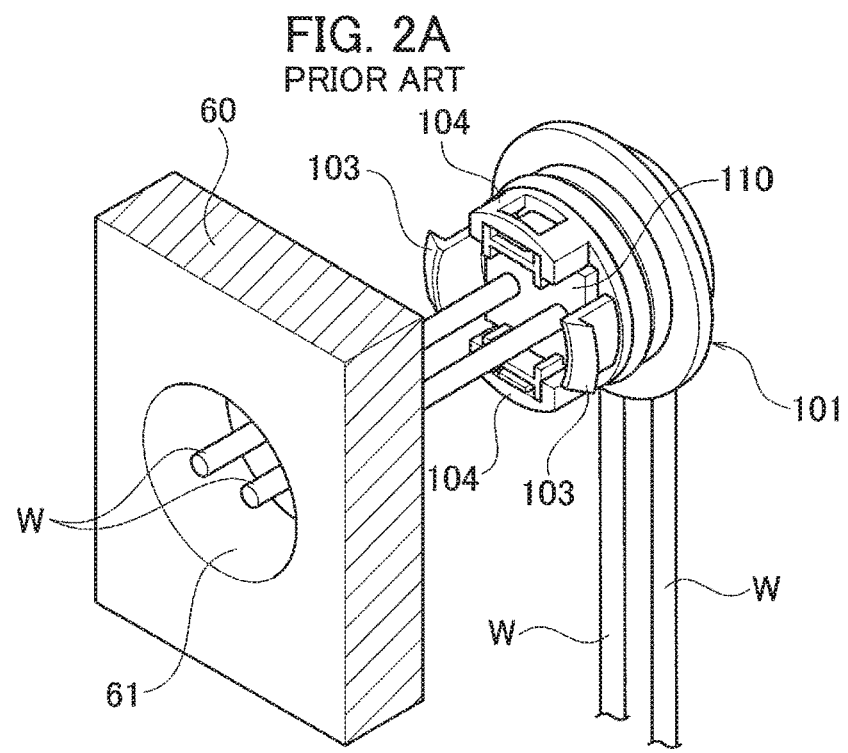
FIG. 2A is a perspective view of the waterproof component according to the reference example before attachment to an attachment hole.
Figure 2B:
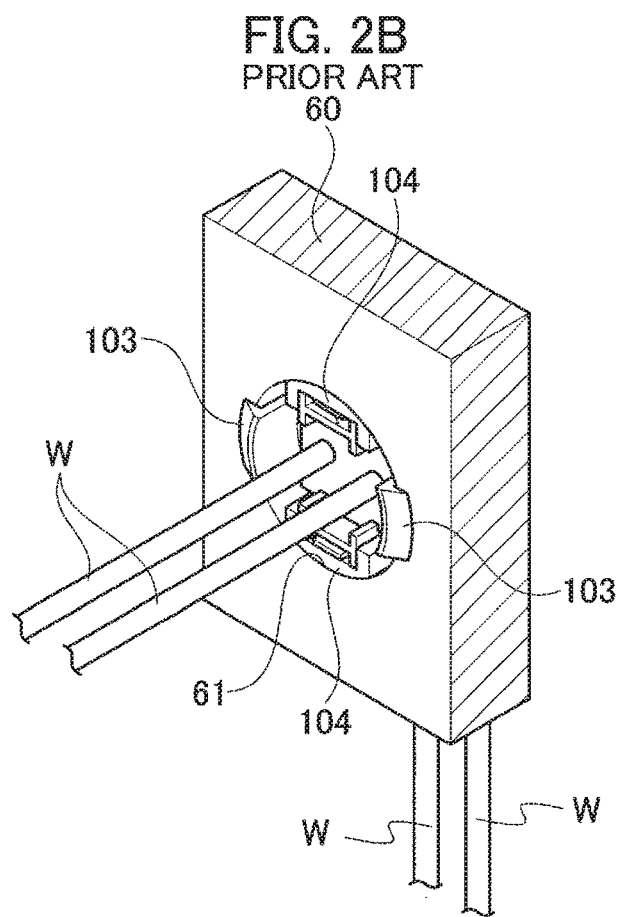
FIG. 2B is a perspective view of the waterproof component according to the reference example after attachment to the attachment hole is completed.
Figure 3A:
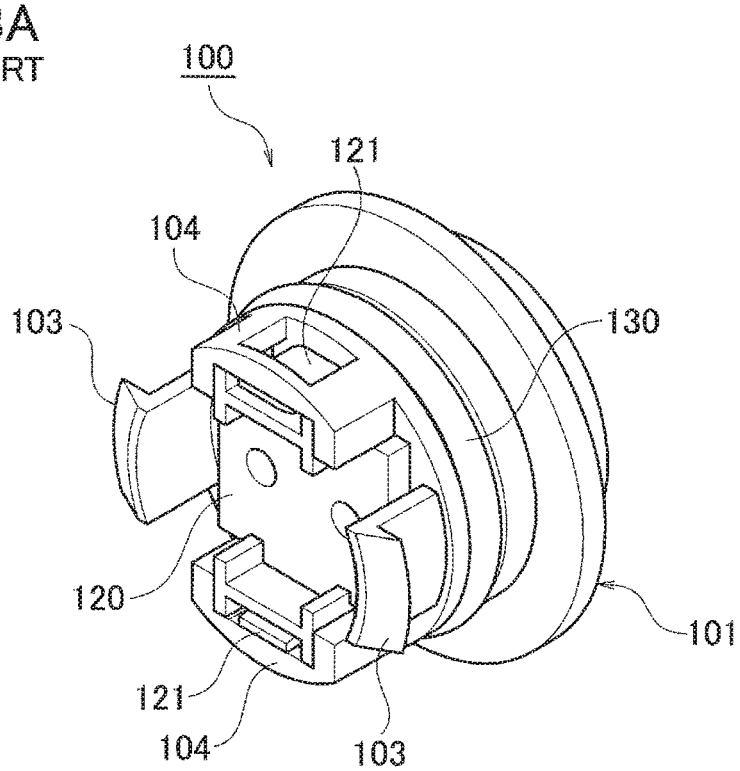
FIG. 3A is a perspective view of the waterproof component according to the reference example.
Figure 3B:
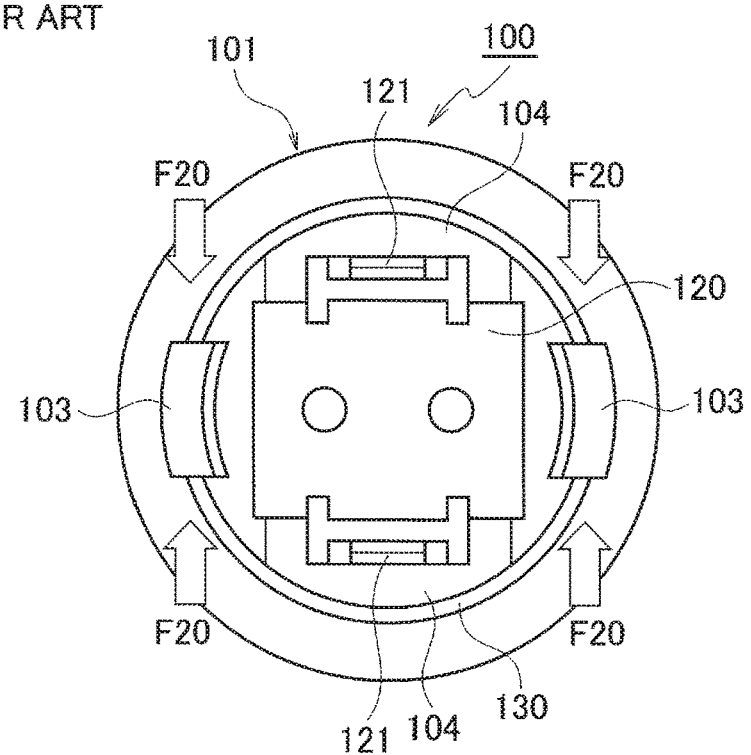
FIG. 3B is a diagram viewed from the mat seal cover side of the waterproof component according to the reference example showing the direction of action of the external force F20.
Figure 4:
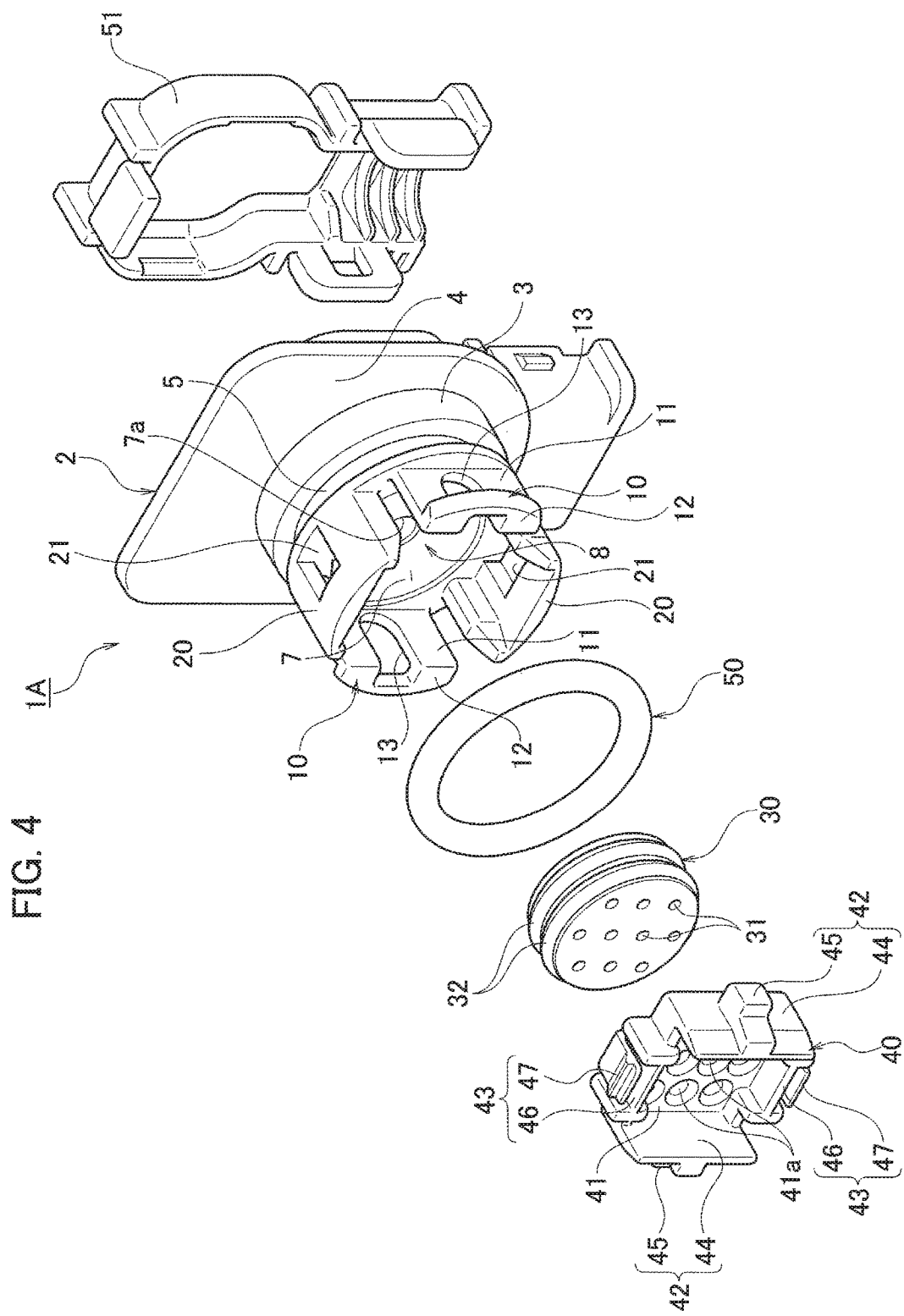
FIG. 4 is an exploded perspective view of a waterproof component according to a first embodiment of the present invention.
Figure 5:
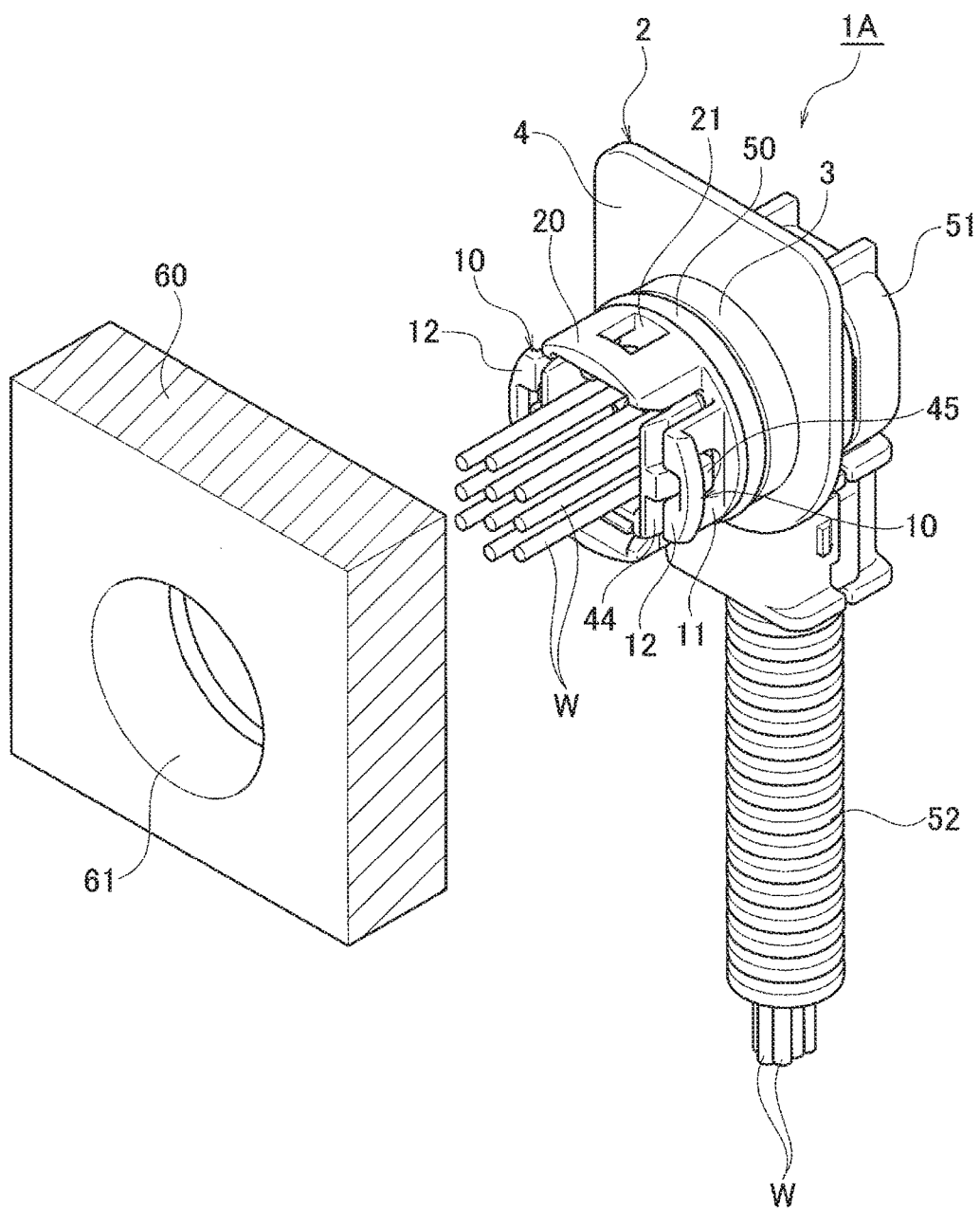
FIG. 5 is a perspective view of the wall and the waterproof component according to the first embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Description will be hereinbelow provided for embodiments of the present invention by referring to the drawings. It should be noted that the same or similar parts and components throughout the drawings will be denoted by the same or similar reference signs, and that descriptions for such parts and components will be omitted or simplified. In addition, it should be noted that the drawings are schematic and therefore different from the actual ones.

First Embodiment

FIGS. 4 to 9, 12A to 12C, 14A, and 15A show a first embodiment of the present invention. A wall 60 of the vehicle body panel or the like separates the wet area from the waterproof area. The wall 60 is formed with a cylindrical attachment hole 61. The waterproof component 1A attached to the outer peripheral side of the electric wires W is attached to the attachment hole 61.

The waterproof component 1A includes a housing body 2, a mat seal 30, a mat seal cover 40, an elastic ring 50, and an electric wire cover 51.

The housing body 2 includes an attachment hole insertion portion 3, a base flange portion 4 being an abutment surface fixed to the insertion back end of the attachment hole insertion portion 3, and a pair of locking claws 10 and a pair of cover locking portions 20 protruding on the tip end side of the attachment hole insertion portion 3.

The attachment hole insertion portion 3 has a cylindrical shape and is formed to have an outer diameter smaller than that of the attachment hole 61. At the tip of the attachment hole insertion portion 3, a circumferential groove 5 is formed. The elastic ring 50 is attached to the circumferential groove 5. A mat seal accommodating chamber 8 having a bottom wall 7 is provided inside the attachment hole insertion portion 3. An electric wire insertion hole 7a is formed in the bottom wall 7.

The pair of locking claws 10 are arranged in positions facing each other at 180 degrees, and the pair of cover locking portions 20 are arranged in positions facing each other at 180 degrees. That is, the locking claws 10 and the cover locking portions 20 are arranged alternately in the circumferential direction at intervals.

Each locking claw 10 includes an elastic support wall (support wall) 11 protruding from the attachment hole insertion portion 3 and a claw portion 12 protruding outward in the circumferential direction from the tip of the elastic support wall 11. The outer peripheral surface of the elastic support wall 11 is formed not on a circular arc surface but on a flat surface. Thus, the elastic support walls 11 are formed in an easily elastically-deformed shape in an inward direction being a direction in which the elastic support walls 11 approach each other. The elastic support wall 11 is formed with a position restricting hole 13 penetrating between the inner surface and the outer surface.

The tip side in the protruding direction of the claw portion 12 has an arc shape. The diameter dimension of the arc locus on the tip side of the claw portion 12 is formed larger than the diameter of the attachment hole 61.

The outer peripheral surface of each cover locking portion 20 is formed on a circular arc surface flush with the outer peripheral surface of the attachment hole insertion portion 3. The cover locking portion 20 is formed with a locking hole 21 penetrating between the inner surface and the outer surface.

The mat seal 30 is formed of an elastic deformable material (for example, a rubber material). The mat seal 30 is substantially disc-shaped. In the mat seal 30, ten electric wire press-fitting holes 31 are formed in positions line-symmetrical with respect to any virtual line passing through the center of the mat seal 30. The mat seal 30 is formed so that the front side and the back side have the same shape. In each electric wire press-fitting hole 31, an electric wire W is penetrated in a press-fit state. On the outer peripheral surface of the mat seal 30, two lines of the sealing projections 32 are provided over the entire circumference. The mat seal 30 is press-fitted into the mat seal accommodating chamber 8 with the sealing projection 32 compressed and deformed.

The mat seal cover 40 includes a rectangular mat pressing portion 41, a pair of locking claw protection portions 42 erected from the mat pressing portion 41, and a pair of locking walls 43 erected from the mat pressing portion 41.

Ten electric wire insertion holes 41a are formed in the mat pressing portion 41.

The pair of locking claw protection portions 42 are provided in positions facing each other at 180 degrees and the pair of locking walls 43 are provided in positions facing each other at 180 degrees, similarly to the pair of locking claws 10 and the pair of cover locking portions 20 of the housing body 2. That is, the pair of locking claw protection portions 42 are arranged in positions corresponding to the pair of locking claws 10, and the pair of locking walls 43 are arranged in positions corresponding to the pair of cover locking portions 20.

Figure 9:
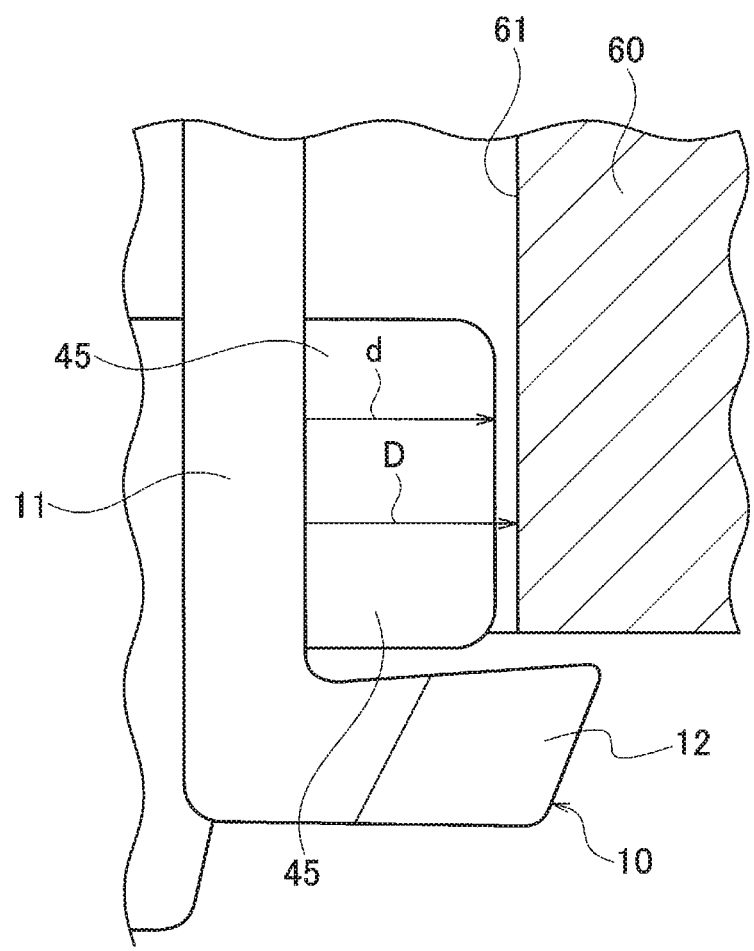
FIG. 9 is a side view of a main part showing a state in which the waterproof component is attached to the wall according to the first embodiment.
Figure 10:
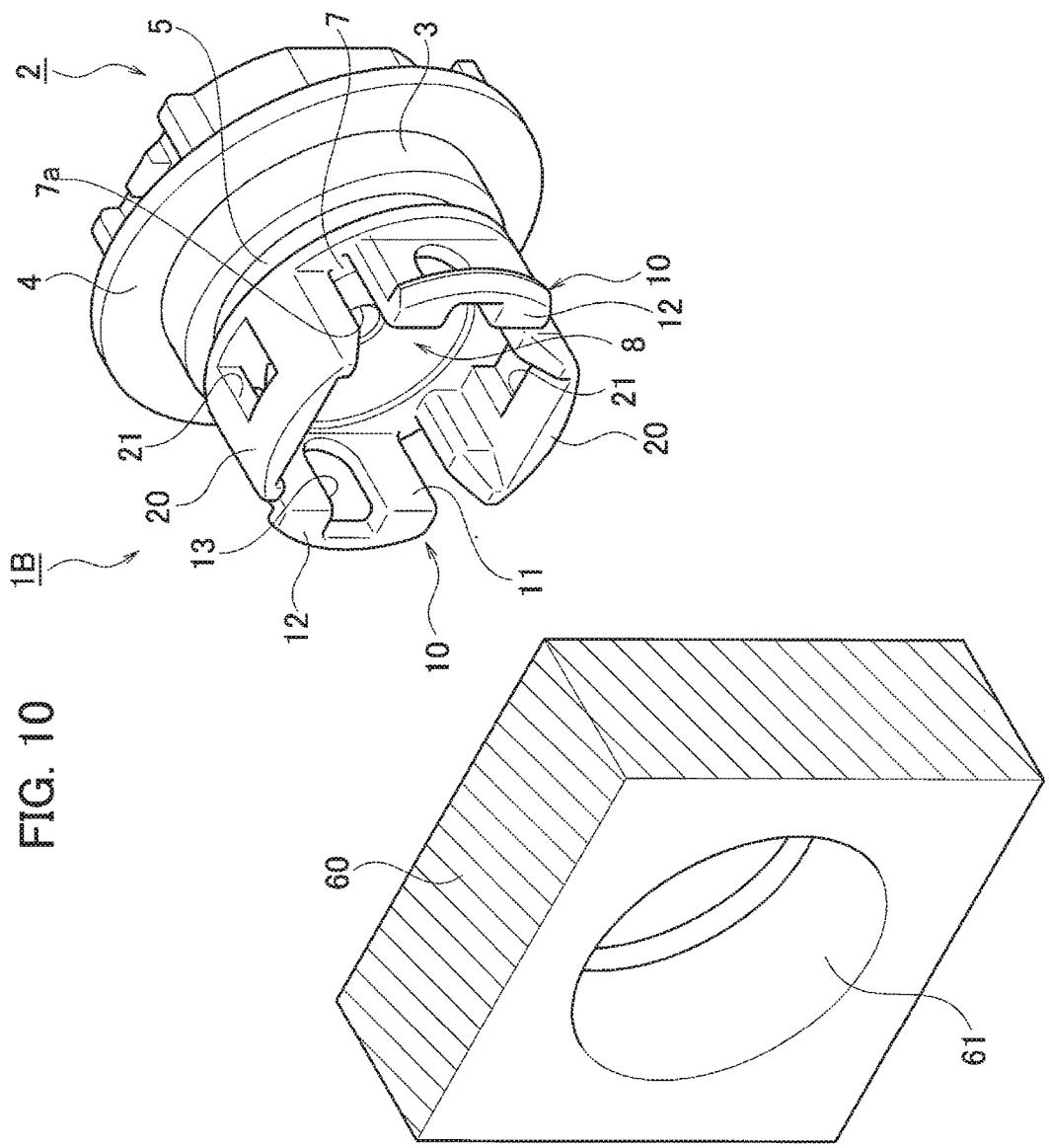
FIG. 10 is a perspective view of a wall and a housing body according to a second embodiment of the present invention.
Figure 11:
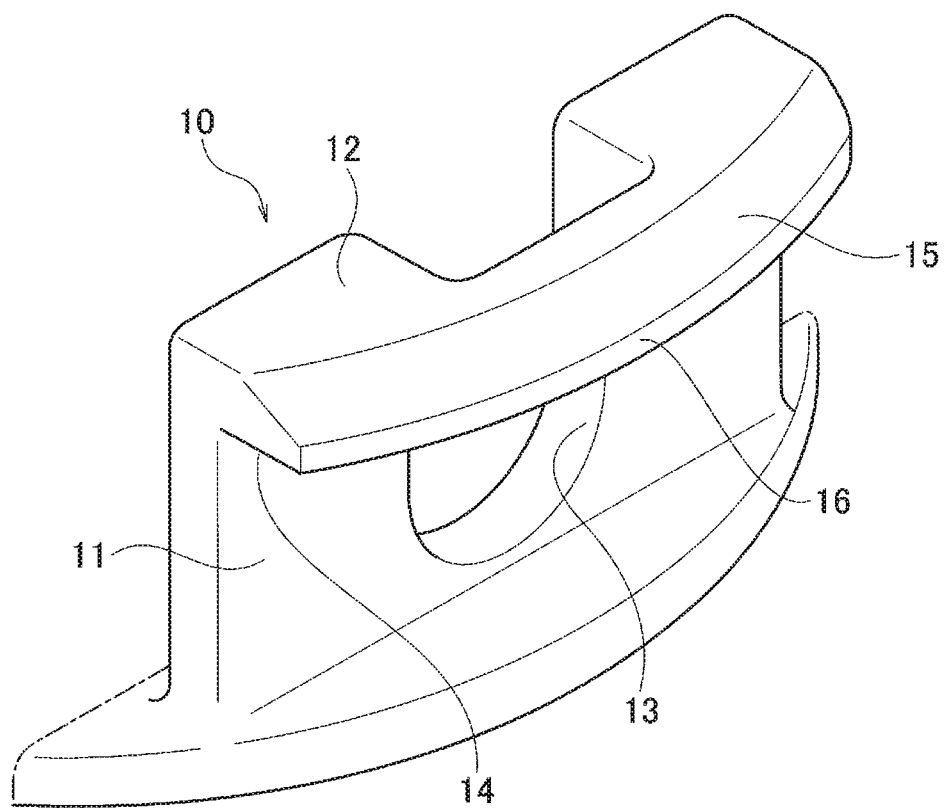
FIG. 11 is a perspective view of a main part of a claw portion of a locking claw according to the second embodiment.

Each locking claw protection portion 42 includes an excessive displacement suppressing wall 44 and a locking claw protection protrusion (protection protrusion) 45 protruding outward from the excessive displacement suppressing wall 44. The excessive displacement suppressing wall 44 is arranged on the inner peripheral side of the elastic support wall 11 of the housing body 2 in a state of being attached to the housing body 2. The elastic support wall 11 of the housing body 2 prevents the excessive displacement of the elastic deformation in the direction in which the claw portion 12 goes into the attachment hole 61 with the excessive displacement suppressing wall 44. The locking claw protection protrusion 45 is inserted into the position restricting hole 13 of the cover locking portion 20 in a state of being attached to the housing body 2. The insertion tip face of the locking claw protection protrusion 45 protrudes outward from the position restricting hole 13 by the dimension d (FIG. 9).

Each locking wall 43 includes a support side wall 46 and an elastic locking claw 47 protruding outward from the support side wall 46. Locking the elastic locking claw 47 to the locking hole 21 of the cover locking portion 20 of the housing body 2 causes the mat seal cover 40 to be attached to the housing body 2. The mat seal 30 is held in the mat seal accommodating chamber 8 by being interposed between the mat seal cover 40 and the bottom wall 7.

The elastic ring 50 is ring-shaped. The elastic ring 50 is attached to the circumferential groove 5 of the attachment hole insertion portion 3 of the housing body 2.

The electric wire cover 51 is attached to the base flange portion 4 of the housing body 2. The electric wire cover 51 covers the outer periphery of the electric wire W guided to the housing body 2. One end of a corrugated tube 52 (FIG. 5) covering the outer periphery of the electric wires W is attached to the electric wire cover 51.

The schematic assembly of the waterproof component 1A (the assembly of the electric wire cover 51 and the corrugated tube 52 are omitted) is performed as follows. The mat seal 30 is press-fitted into the mat seal accommodating chamber 8 of the housing body 2. Next, the mat seal cover 40 is put on the mat seal 30, and the pair of elastic locking claws 47 of the mat seal cover 40 are locked to the pair of locking holes 21 of the housing body 2. Next, from the base flange portion 4 side of the housing body 2, each electric wire W penetrates the electric wire insertion hole 7a, the electric wire press-fitting hole 31 of the mat seal 30, and the electric wire insertion hole 41a of the mat seal cover 40. This completes the schematic assembly.

Figure 8A:
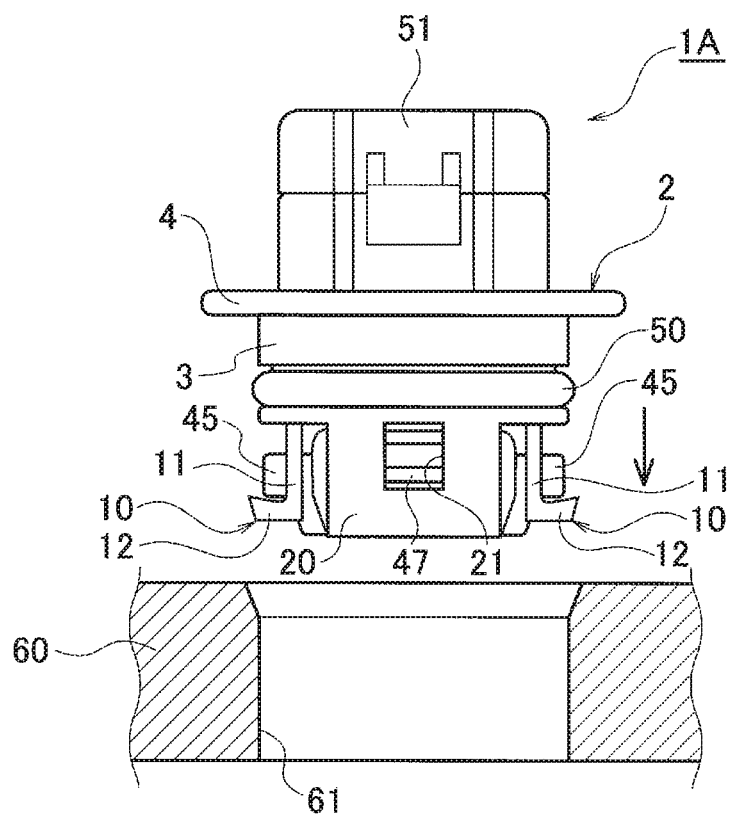
FIG. 8A is a side view showing a process of attaching the waterproof component to the wall according to the first embodiment.
Figure 8B:
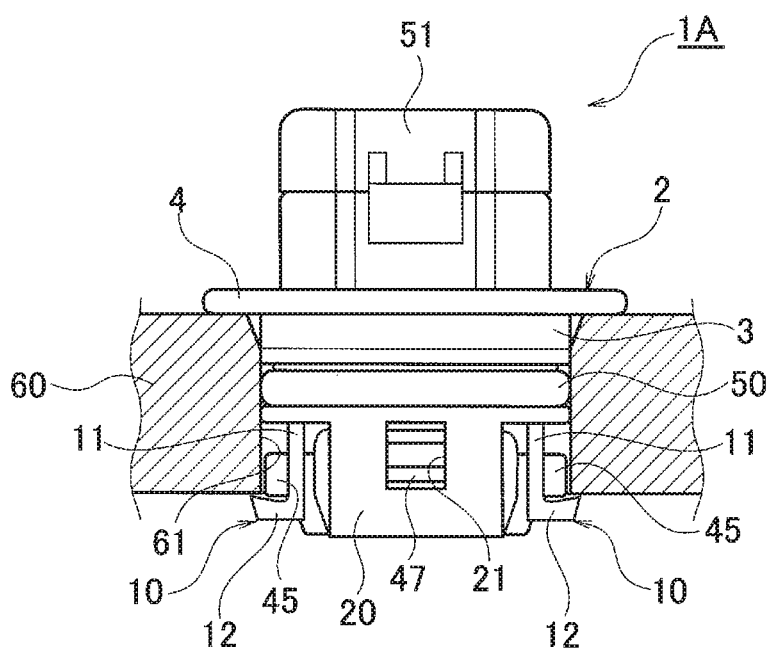
FIG. 8B is a side view showing a state in which the waterproof component is attached to the wall according to the first embodiment.

Next, a procedure for attaching the waterproof component 1A to the attachment hole 61 of the wall 60 will be described. As shown in FIG. 8A, the waterproof component 1A is inserted into the attachment hole 61 of the wall 60 from the wet area with the claw portions 12 of the pair of the locking claws 10 as a tip. Then, first, the pair of claw portions 12 interfere with the wall 60 on the periphery of the attachment hole 61. When the waterproof component 1A is further inserted from this state, a pair of claw portions 12 receive reaction forces from the wall 60, and each of the pair of elastic support walls 11 is elastically deformed by the reaction forces in the direction to make each claw portion 12 go into the attachment hole 61, so that the pair of claw portions 12 are inserted into the attachment hole 61. When the pair of claw portions 12 pass through the attachment hole 61, the pair of elastic support walls 11 are elastically restored and deformed, so that the pair of claw portions 12 are locked to the periphery of the attachment hole 61. At a position where the pair of claw portions 12 pass through the attachment hole 61, the base flange portion 4 of the housing body 2 comes into close contact with the periphery of the attachment hole 61 (see FIG. 8B).

That is, the waterproof component 1A is sandwiched between the base flange portion 4 for abutting on the periphery of one side of the wall 60 of the attachment hole 61 and the periphery of the other side (opposite side) of the wall 60 of the attachment hole 61, thereby being attached to the attachment hole 61. The space between the inner wall surface of the attachment hole 61 and the outer peripheral surface of the attachment hole insertion portion 3 of the waterproof component 1A is sealed by the compressive force of the elastic ring 50. The gap between each electric wire W and the mat seal 30 is sealed with the press fitting of the electric wire W into the electric wire press-fitting hole 31.

The waterproof component 1A can be attached by one action of the insertion thereof into the attachment hole 61 of the wall 60.

As described above, the waterproof component 1A includes: a housing body 2 including: an attachment hole insertion portion 3 configured to be inserted in the attachment hole 61 of the wall 60, the attachment hole insertion portion 3 having a mat seal accommodating chamber 8 formed inside, the mat seal accommodating chamber 8 having a bottom wall 7, a base flange portion 4 being an abutting portion configured to abut on the periphery of the attachment hole 61, a locking claw 10 elastically deformably provided on an insertion tip side of the attachment hole insertion portion 3, the locking claw 10 configured to be locked to a periphery of the attachment hole 61 opposite to the base flange portion 4, and a cover locking portion 20 provided on the insertion tip side of the attachment hole insertion portion 3; a mat seal 30 configured to be accommodated in the mat seal accommodating chamber 8, the mat seal 30 having an electric wire press-fitting hole 31 through which the electric wire W penetrates; and a mat seal cover 40 configured to be locked to the cover locking portion 20, the mat seal cover 40 configured to sandwich the mat seal 30 with the bottom wall 7 to hold the mat seal 30 in the mat seal accommodating chamber 8. The locking claw 10 includes: an elastic support wall 11 configured to be inserted into the attachment hole 61 together with the attachment hole insertion portion 3, the elastic support wall 11 being elastically deformable, and a claw portion 12 formed at a tip of the elastic support wall 11, the claw portion 12 protruding outward from an outer surface of the elastic support wall 11. The mat seal cover 40 includes a locking claw protection protrusion 45 configured to prevent displacement of the elastic support wall 11 toward a direction other than a direction of elastic deformation of the directions of the claw portion 12 entering the attachment hole 61.

Therefore, as shown in FIG. 7, when an external force F10 in a direction other than a direction of the elastic deformation of the directions in which the claw portion 12 enters the attachment hole 61 acts on the locking claw 10, even if the external force F10 is an external force exceeding the strength of the locking claw 10 in itself, the locking claw protection protrusion 45 prevents the deformation of the locking claw 10, so that the damage to the locking claw 10 can be prevented as much as possible.

The elastic support wall 11 has a position restricting hole 13, and the locking claw protection protrusion 45 is inserted in the position restricting hole 13. Therefore, the external forces (F10) in both left and right directions can be blocked with the single locking claw protection protrusion 45 and the position restricting hole 13.

As shown in detail in FIG. 9, the locking claw protection protrusion 45 protrudes from the outer surface of the elastic support wall 11 to be arranged in the attachment hole 61. Therefore, in the waterproof component 1A, since the gap (D–d) formed in the attachment hole 61 becomes smaller by the protrusion amount d of the locking claw protection protrusion 45 protruding from the elastic support wall 11, the backlash of the waterproof component 1A in the lateral direction is prevented, and the damage to the locking claw 10 is also prevented.

The locking claw protection portion 42 includes an excessive displacement suppressing wall 44 Therefore, excessive displacement of the elastic support wall 11 can be prevented at the time of elastic deformation in the direction in which the claw portion 12 enters the attachment hole 61.

Second Embodiment

FIGS. 10, 11, 13A to 13C, 14B, and 15B show a second embodiment of the present invention. The waterproof component 1B of the second embodiment differs from the waterproof component 1A of the first embodiment in the configuration of the claw portion 12 of the locking claw 10.

Figure 12A:
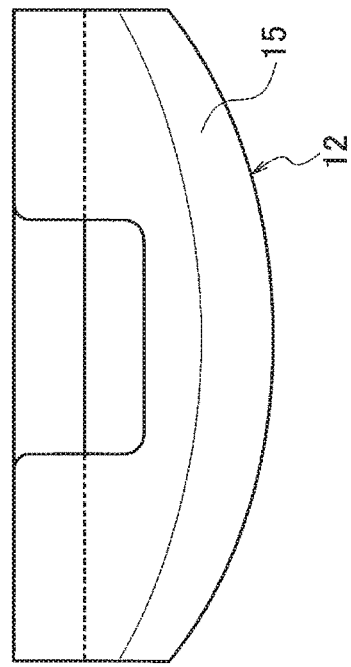
FIG. 12A is a plan view of the claw portion according to the first embodiment.
Figure 12B:
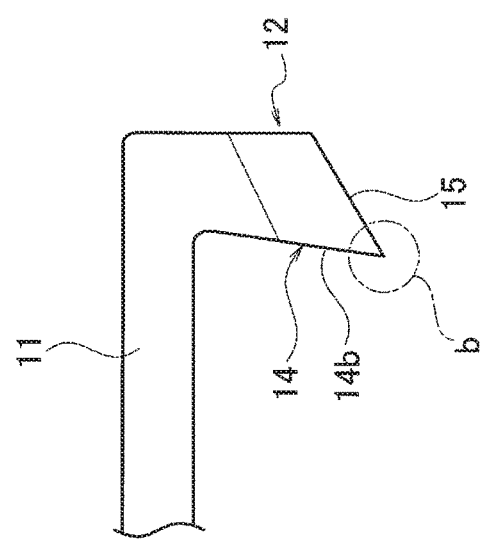
FIG. 12B is a side view of the claw portion according to the first embodiment.
Figure 12C:
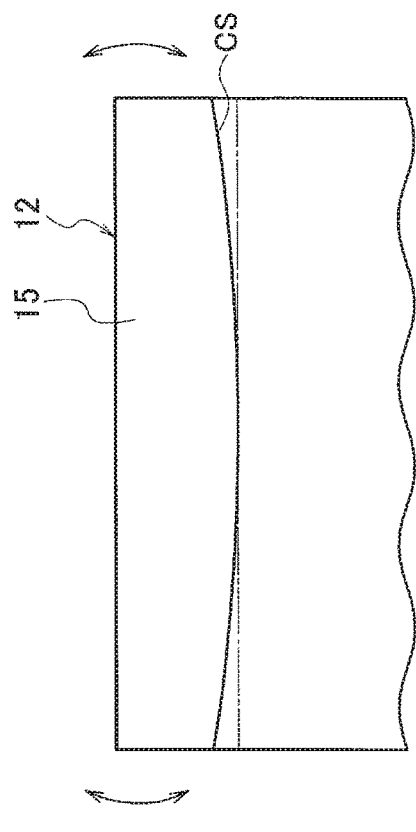
FIG. 12C is a front view of the claw portion according to the first embodiment.

First, the configuration of the claw portion 12 of the first embodiment will be described with reference to FIGS. 12A to 12C. In the claw portion 12 of the first embodiment, as shown in FIG. 12B, the locking surface 14 being a side that abuts on the periphery of the attachment hole 61 is formed on the reverse tapered surface (the surface inclined in the detaching direction of the attachment hole 61 from the inner peripheral side to the outer peripheral side) 14b when viewed from the side of the locking claw 10. Therefore, as shown in FIG. 12C, the tip shape of the claw portion 12 extending in the circumferential direction of the locking surface 14 becomes a curved shape CS as viewed from the outer peripheral side. This is because the claw portion 12 is formed into a cylindrical locus as a part of the housing body 2 by die molding.

Figure 14A:
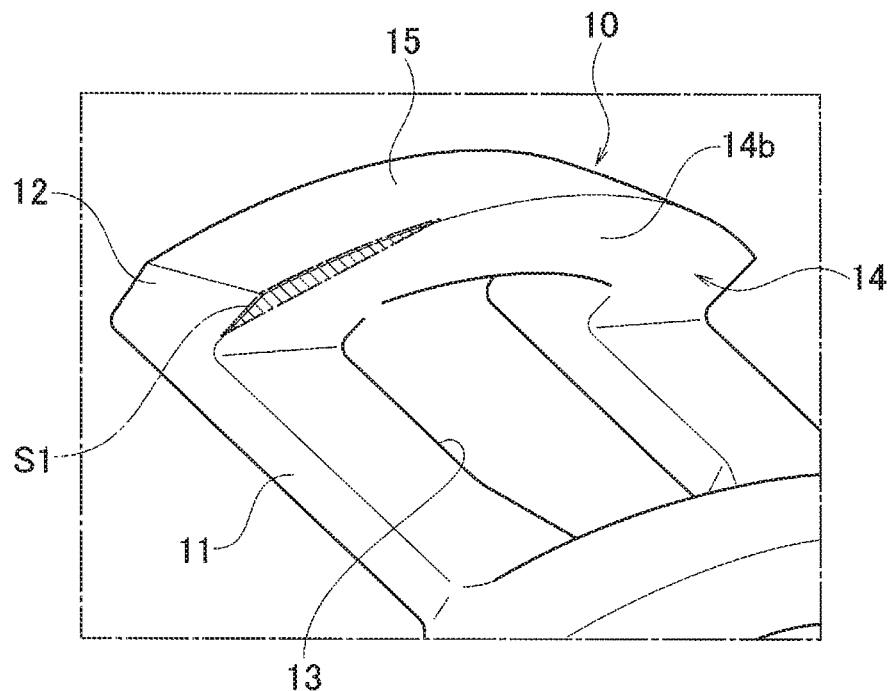
FIG. 14A is a perspective view of the claw portion according to the first embodiment as viewed from the locking surface side.

In the first embodiment, even when the claw portion 12 flexes to deform at the time of detachment from the attachment hole 61 of the waterproof component 1A, the locking surface 14 of the claw portion 12 does not have a forward tapered shape (a shape that is inclined in the attachment direction of the attachment hole 61 from the inner peripheral side to the outer peripheral side). Accordingly, the holding power of the waterproof component 1A is intended to be increased. However, as described above, since the tip shape of the locking surface 14 of the claw portion 12 becomes the curved shape CS, the claw portion 12 is inclined at the time of detachment from the attachment hole 61 of the waterproof component 1A (in the direction of the arrow in FIG. 12C). As shown in FIG. 14A, the inclination of the claw portion 12 reduces the contact surface S1 (hatched region in FIG. 14A) of the locking surface 14 of the claw portion 12 to the wall 60, decreasing the holding power of the waterproof component 1A.

Figure 13A:
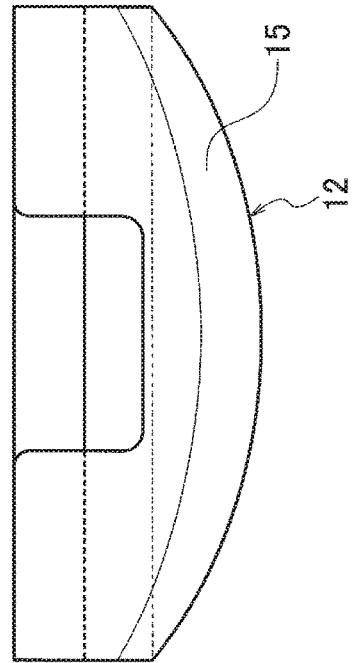
FIG. 13A is a plan view of the claw portion according to the second embodiment.
Figure 13C:
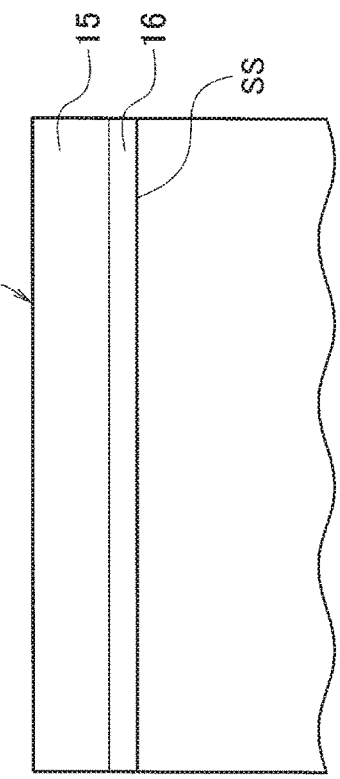
FIG. 13C is a front view of the claw portion according to the second embodiment.
Figure 13B:
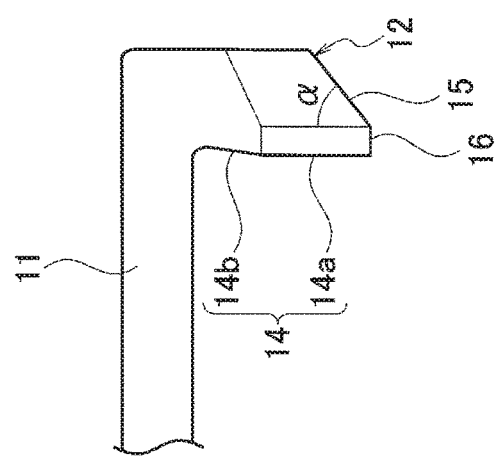
FIG. 13B is a side view of the claw portion according to the second embodiment.

On the other hand, as shown in FIG. 13B, in the claw portion 12 of the second embodiment, as viewed from the side of the locking claw 10, the locking surface 14 being the side that abuts on the periphery of the attachment hole 61 has its tip part formed on the straight surface (a surface not inclined in the detaching direction or in the attaching direction of the attachment hole from the inner peripheral side to the outer peripheral side) 14a and a part inside the tip part formed on the reverse tapered surface 14b. Thus, as shown in FIG. 13C, the tip shape of the claw portion 12 extending in the circumferential direction of the locking surface 14 becomes a straight shape SS as viewed from the outer peripheral side.

Figure 14B:
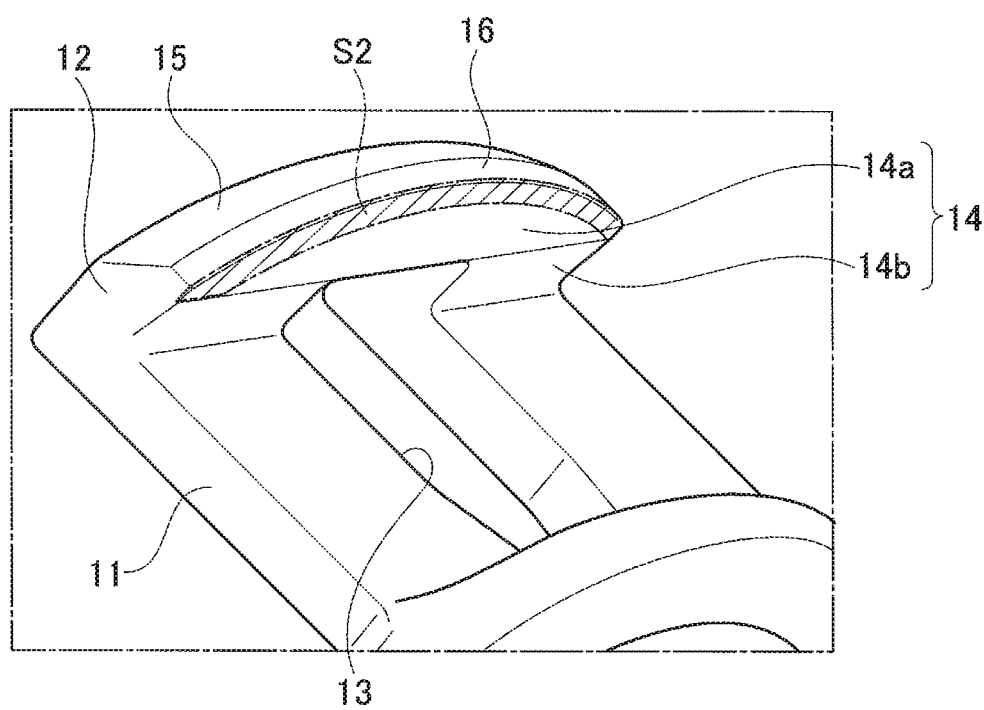
FIG. 14B is a perspective view of the claw portion according to the second embodiment as viewed from the locking surface side.

In the second embodiment, even when the claw portion 12 is flexed to be deformed at the time of detachment from the attachment hole 61 of the waterproof component 1B, since the claw portion 12 partially has the reverse tapered surface 14b, the entire region of the locking surface 14 of the claw portion 12 does not become a forward tapered shape. Then, since the tip shape of the locking surface 14 of the claw portion 12 is a straight shape SS, the claw portion 12 is not inclined at the time of detachment from the attachment hole 61 of the waterproof component 1B. Therefore, as shown in FIG. 14B, the contact surface S2 (the hatched area in FIG. 14B) of the locking surface 14 of the claw portion 12 to the wall 60 is the entire region in the circumferential direction of the claw portion 12, and the holding force of the waterproof component 1B is improved.

Figure 15A:
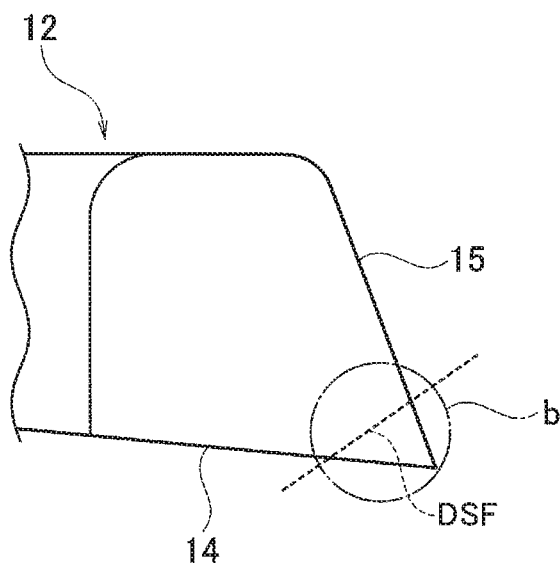
FIG. 15A is a side view for explaining the shearing force acting on the claw portion according to the first embodiment.

In addition, in the claw portion 12 of the first embodiment, as shown in FIG. 15A, the tips of the inclined surface 15 on the insertion side to the attachment hole 61 and the locking surface 14 being the side abutting on the periphery of the attachment hole 61 are connected, and an acute angle portion b is formed in the tip portion. Therefore, the claw portion 12 flexes to deform at the time of detachment of the waterproof component 1A from the attachment hole 61, whereby a shearing force acts on the position of the acute angle portion b as indicated by the broken line in FIG. 15A. Therefore, the shear area is small, and the holding force of the waterproof component 1A is small. It should be noted that in FIG. 15A, DSF indicates the direction of the shear force.

Figure 15B:
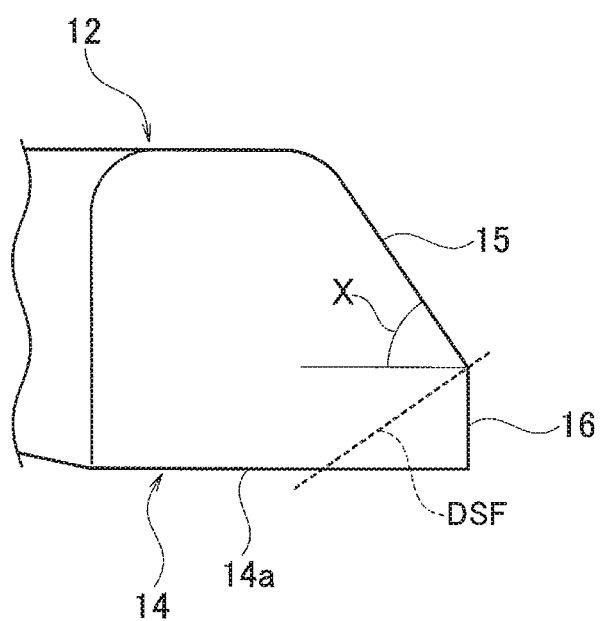
FIG. 15B is a side view for explaining the shearing force acting on the claw portion according to the second embodiment.
Figure 16:
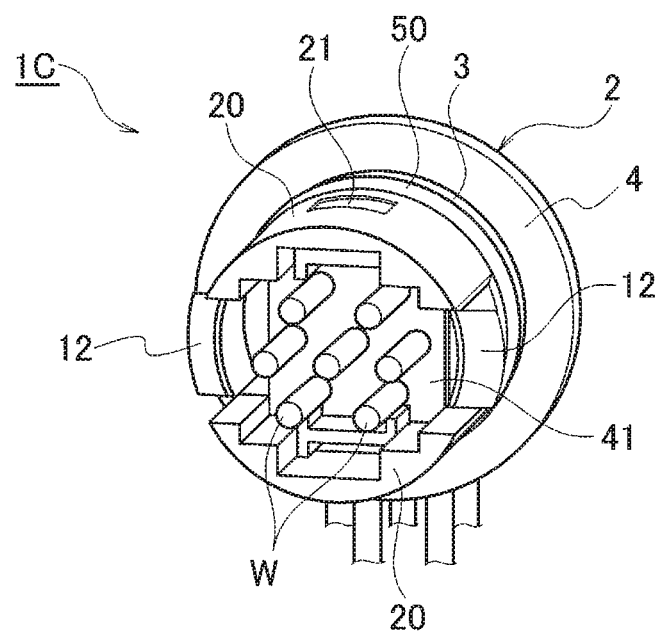
FIG. 16 is a perspective view of the waterproof component according to the first comparative example.
Figure 17:
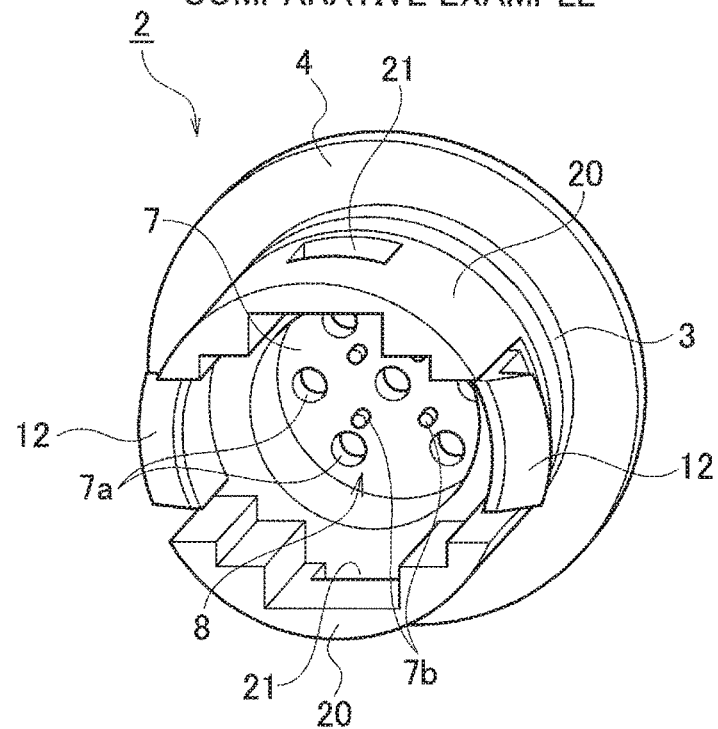
FIG. 17 is a perspective view of the housing body according to the first comparative example.
Figure 18:
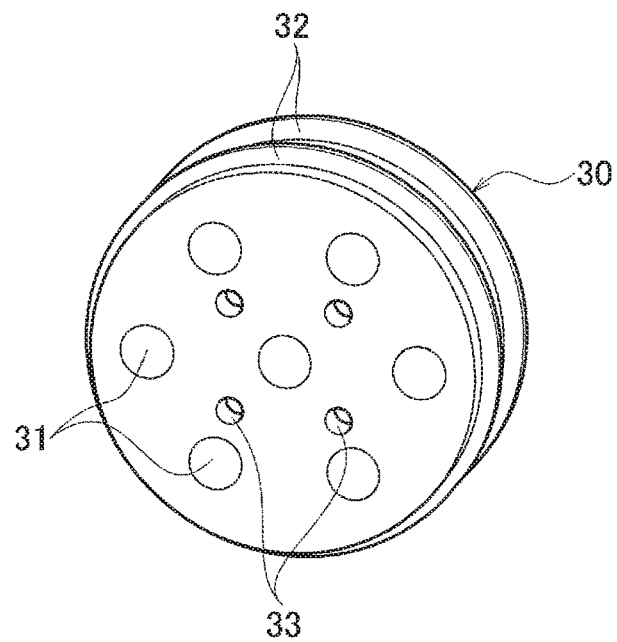
FIG. 18 is a perspective view of the mat seal according to the first comparative example.
Figure 19A:
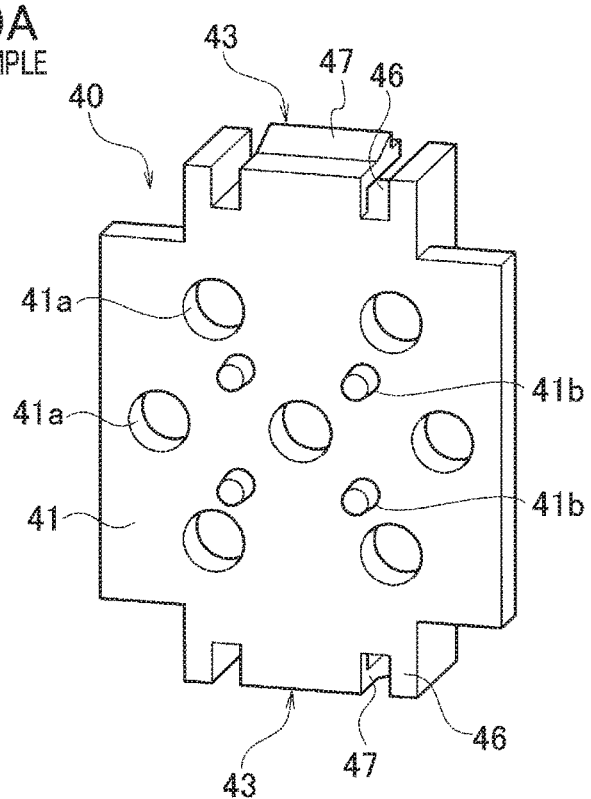
FIG. 19A is a perspective view of the mat seal cover according to the first comparative example.
Figure 19B:
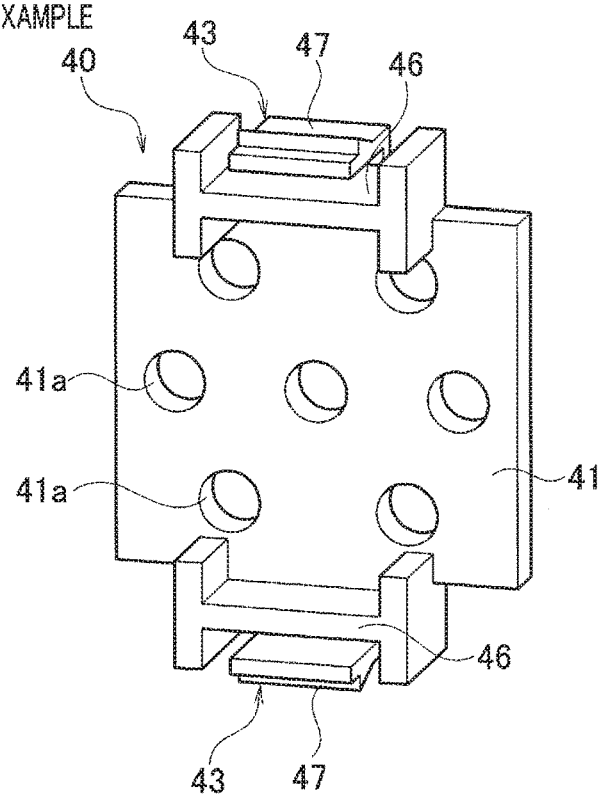
FIG. 19B is a perspective view of the mat seal cover on the side opposite to FIG. 19A according to the first comparative example.
Figure 20:
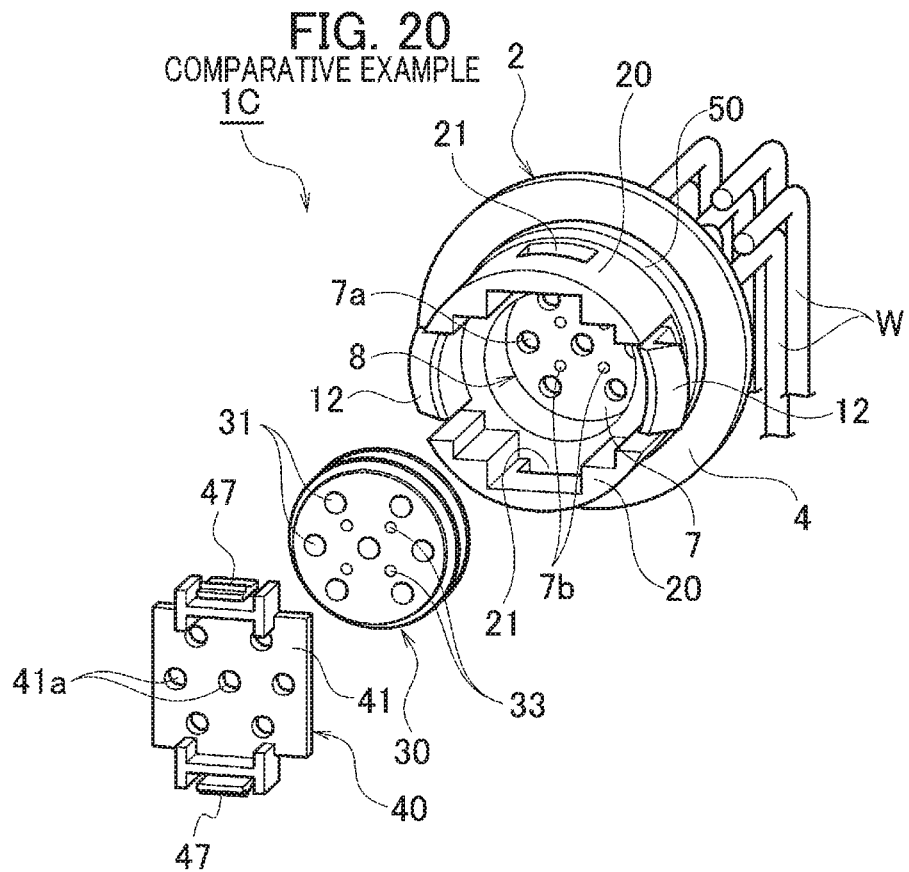
FIG. 20 is an exploded perspective view of a waterproof member according to the first comparative example.
Figure 21:
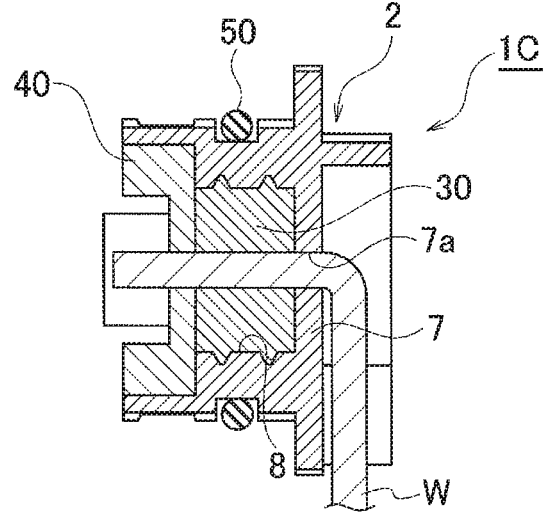
FIG. 21 is a cross-sectional view of the waterproof member according to the first comparative example.
Figure 22A:
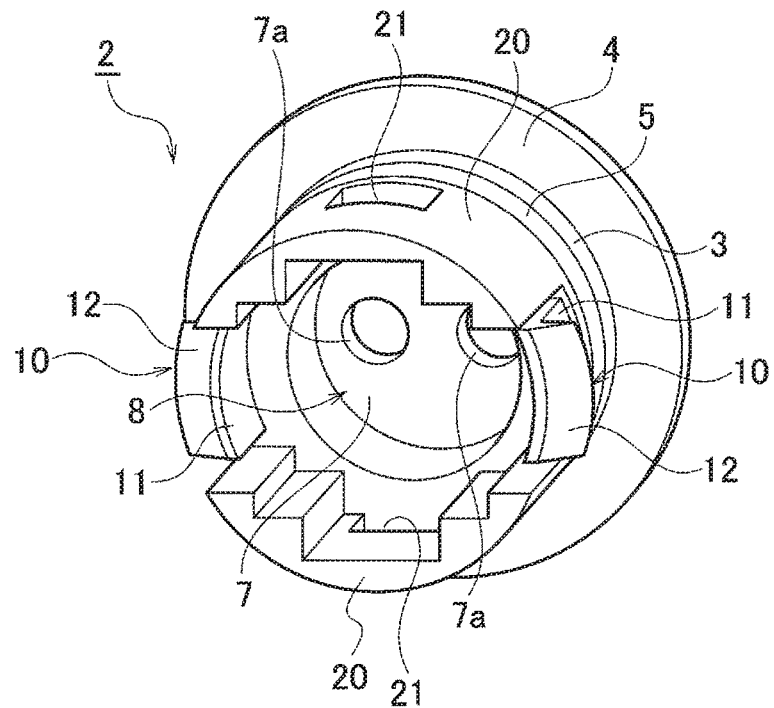
FIG. 22A is a perspective view of a housing body according to a second comparative example.
Figure 22B:
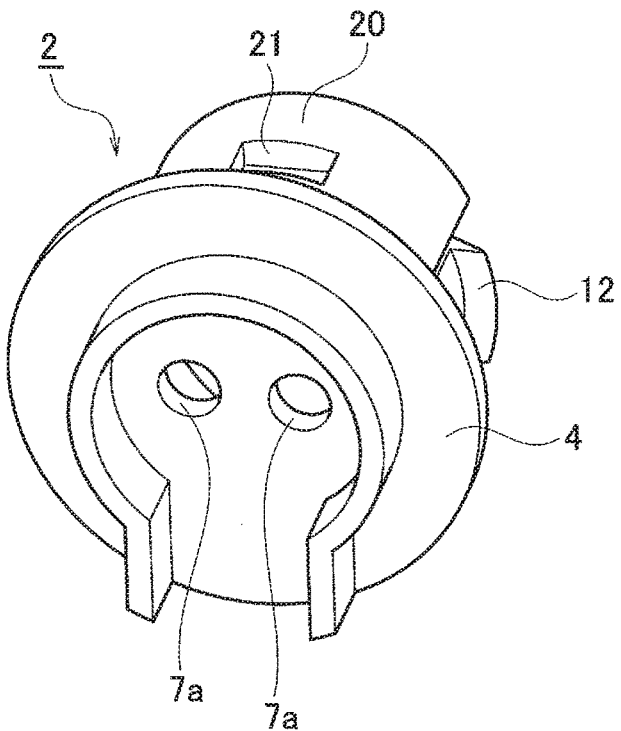
FIG. 22B is a perspective view of the housing body according to the second comparative example as viewed from the side opposite to FIG. 22A.
Figure 23A:
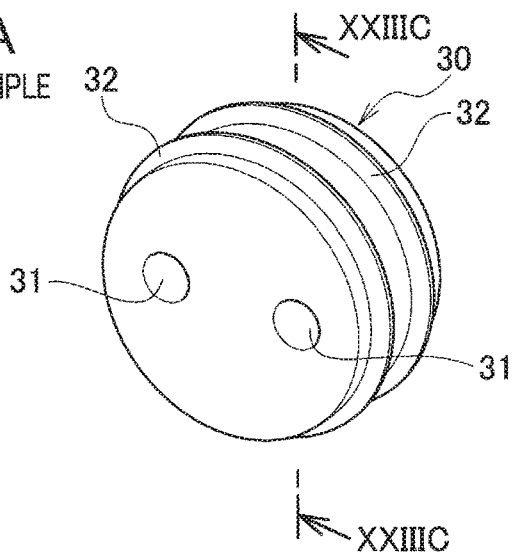
FIG. 23A is a perspective view of a mat seal according to the second comparative example.
Figure 23B:
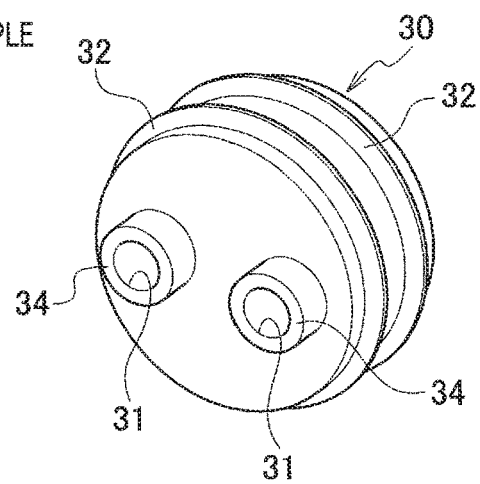
FIG. 23B is a perspective view of the mat seal according to the second comparative example as viewed from the side opposite to FIG. 23A.
Figure 23C:
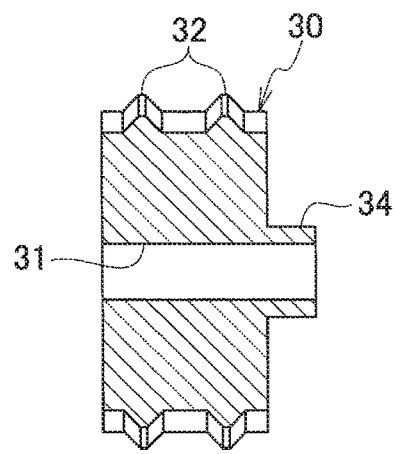
FIG. 23C is a cross-sectional view taken along the line XXIIIC-XXIIIC in FIG. 23A.
Figure 24A:
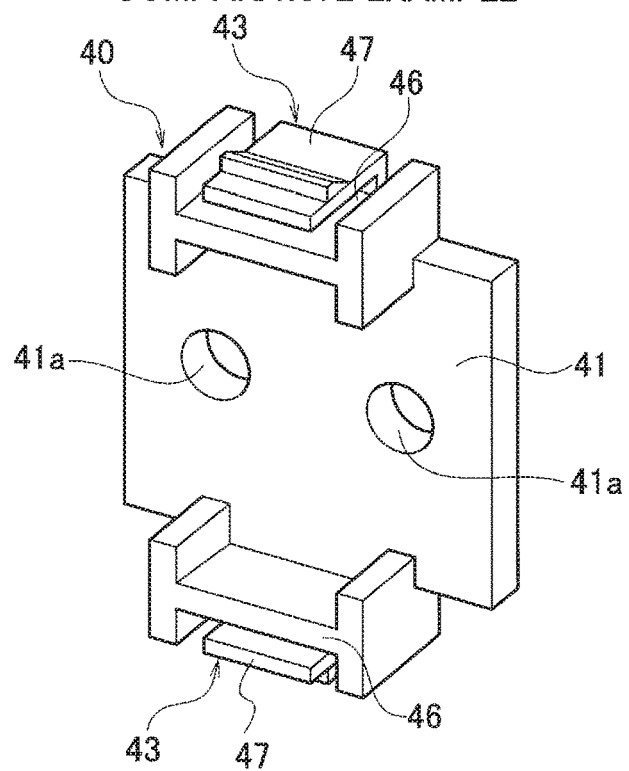
FIG. 24A is a perspective view of a mat seal cover according to the second comparative example.
Figure 24B:
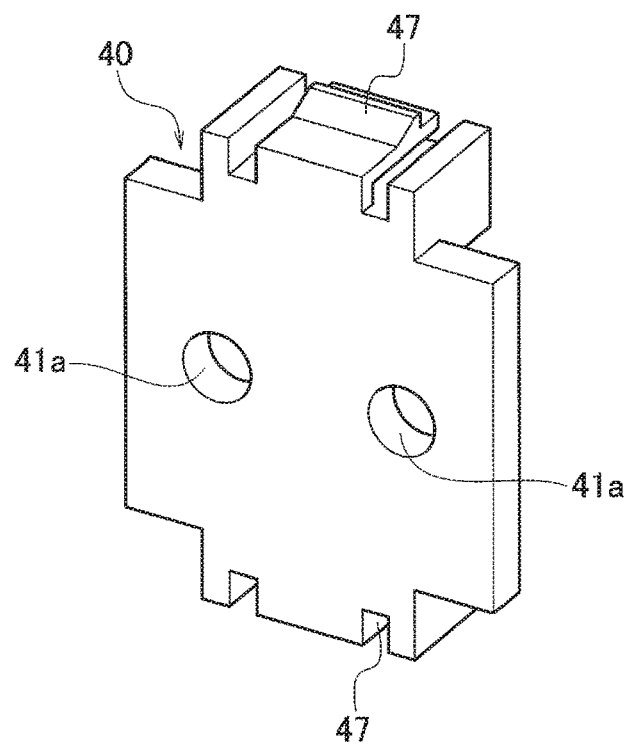
FIG. 24B is a perspective view of the mat seal cover according to the second comparative example as viewed from the side opposite to FIG. 24A.
Figure 26:
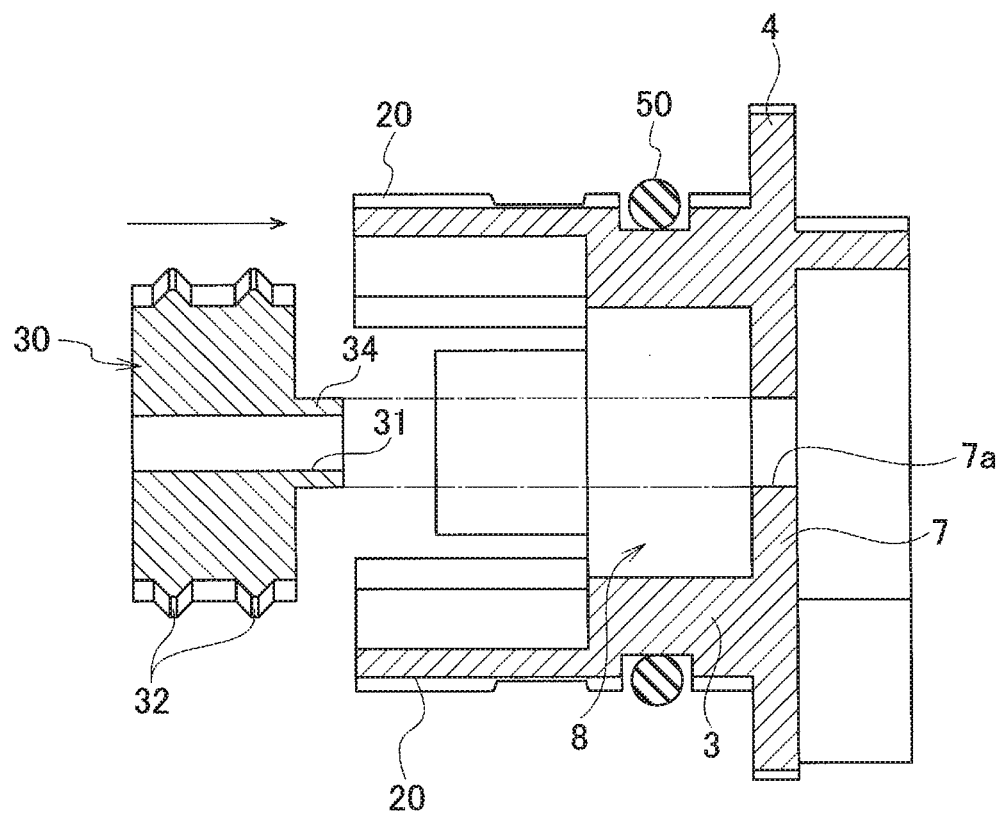
FIG. 26 is a cross-sectional view of FIG. 25A according to the second comparative example.
Figure 27A:
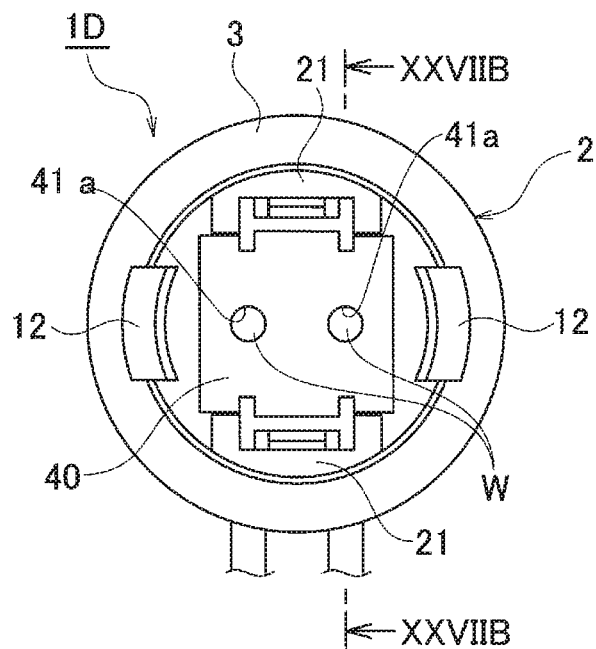
FIG. 27A is a view of the waterproof component according to the second comparative example as viewed from the mat seal cover side.
Figure 27B:
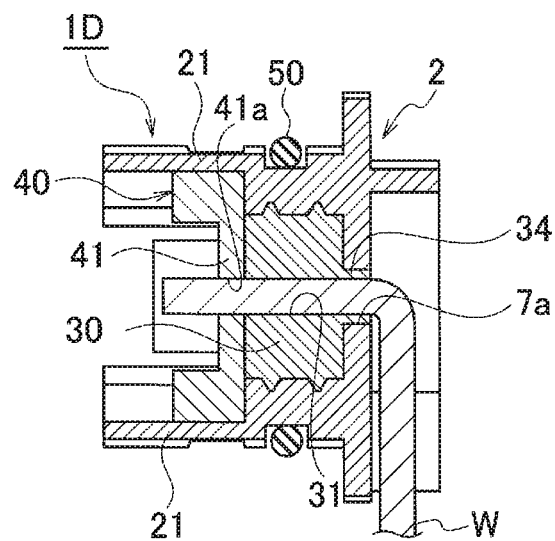
FIG. 27B is a cross-sectional view taken along the line XXVIIB-XXVIIB in FIG. 27A.

On the other hand, as shown in FIG. 15B, in the claw portion 12 of the second embodiment, the gap between the inclined surface 15 on the insertion side to the attachment hole 61 and the locking surface 14 being the side abutting on the periphery of the attachment hole 61 is connected with a cut surface 16. Thus, no acute angle portion is formed in the tip portion of the claw portion 12. In addition, the angle X of the inclined surface 15 is formed to be more obtuse than that in the first embodiment. Therefore, the claw portion 12 flexes to deform at the time of detachment of the waterproof component 1B from the attachment hole 61, whereby a shearing force acts as indicated by the broken line in FIG. 15B. Therefore, the shearing area is large, and the holding force of the waterproof component 1B is improved. It should be noted that in FIG. 15B, DSF indicates the direction of the shear force.

First Comparative Example

FIGS. 16 to 22B show a first comparative example. In comparison with the first embodiment, the waterproof component 1C of the first comparative example is not provided with a position restricting hole in each elastic support wall 11 of the housing body 2, and is not provided with each locking wall 43 in the mat seal cover 40.

The waterproof component 1C of the first comparative example is added with the following portions as compared with that of the first embodiment. That is, in the mat seal 30, positioning holes 33 are formed around the electric wire press-fitting holes 31. In the bottom wall 7 of the housing body 2, positioning ribs 7b are formed together with the electric wire insertion holes 7a. In the mat seal cover 40, positioning ribs 41b are formed together with the electric wire insertion holes 41a. In addition, the number of electric wires W penetrating is seven.

The respective positioning ribs 7b and 41b of the housing body 2 and the mat seal cover 40 are both inserted into the positioning holes 33 of the mat seal 30. Therefore, since the position of each electric wire press-fitting hole 31 of the mat seal 30 is positioned by the housing body 2 and the mat seal cover 40, the position displacement of the mat seal 30 is prevented, and the mat seal 30 reliably seals the electric wires W.

Since other configurations are substantially the same as those of the first embodiment, the same components are denoted by the same reference numerals, and description thereof is omitted.

Second Comparative Example

FIGS. 23A to 27B show a second comparative example. As compared with the first embodiment, the waterproof component 1D of the second comparative example is not provided with a position restricting hole in each elastic support wall 11 of the housing body 2, and is not provided with each locking wall 43 of the mat seal cover 40. In addition, the number of electric wires W penetrating is two.

The waterproof component 1D of the second comparative example is different from that of the first embodiment in the following configuration. That is, in the mat seal 30, a protrusion 34 is provided in a position where each electric wire press-fitting hole 31 is formed. Each electric wire press-fitting hole 31 is formed so as to penetrate the protrusion 34. In the bottom wall 7 of the housing body 2, an electric wire insertion hole 7a is formed, and the dimensions of the electric wire insertion hole 7a are formed so that the electric wire insertion hole 7a is also inserted into the protrusion 34. Each protrusion of the mat seal 30 is inserted in the electric wire insertion hole 7a of the bottom wall 7 of the housing body 2.

Therefore, since the electric wire W does not come into direct contact with the bottom wall 7 of the housing body 2, damage to the electric wire W can be prevented.

Since other configurations are substantially the same as those of the first embodiment, the same components are denoted by the same reference numerals, and description thereof is omitted.

Embodiments of the present invention have been described above. However, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

Moreover, the effects described in the embodiments of the present invention are only a list of optimum effects achieved by the present invention. Hence, the effects of the present invention are not limited to those described in the embodiment of the present invention.

What is claimed is:

1. A waterproof component comprising:
   a housing body attached to a wall having an attachment hole through which an electric wire penetrates, the housing body including:
     an attachment hole insertion portion inserted in the attachment hole and having a mat seal accommodating chamber formed inside the attachment hole insertion portion, the mat seal accommodating chamber having a bottom wall;
     an abutting portion configured to abut on a first periphery of the attachment hole;
     a locking claw elastically deformably provided on an insertion tip side of the attachment hole insertion portion, the locking claw inserted in the attachment hole together with the attachment hole insertion portion and locked to a second periphery of the attachment hole opposite to the first periphery; and
     a cover locking portion provided on the insertion tip side of the attachment hole insertion portion;
   a mat seal accommodated in the mat seal accommodating chamber and having an electric wire press-fitting hole through which the electric wire penetrates; and
   a mat seal cover locked to the cover locking portion, the mat seal cover configured to sandwich the mat seal with the bottom wall and hold the mat seal in the mat seal accommodating chamber, wherein
   the locking claw includes:
     an elastically deformable support wall; and
     a claw portion formed at a tip of the support wall and protruding outward from an outer surface of the support wall, and
   the mat seal cover includes a protection protrusion configured to prevent displacement of the support wall toward a direction other than a direction of an elastic deformation of the support wall for insertion of the claw portion in the attachment hole.

2. The waterproof component according to claim 1, wherein a tip side in a protruding direction of the claw portion has a circular-arc shape, the claw portion has a locking surface on a side of the claw portion abutting on the second periphery of the attachment hole, and the locking surface includes:

a straight surface extending along a surface of the wall and positioned in a tip part of the claw portion in a side view of the locking claw; and a reverse tapered surface positioned nearer than the tip part to the support wall in the side view.

3. The waterproof component according to claim 1, wherein the claw portion includes:

an inclined surface on an insertion side of the claw portion to the attachment hole;

a locking surface on a side of the claw portion abutting on the second periphery of the attachment hole; and a cut surface connecting the inclined surface and the locking surface.

4. The waterproof component according to claim 1, wherein the support wall has a position restricting hole, and the protection protrusion extends into the position restricting hole with the mat seal cover locked to the cover locking portion.

5. The waterproof component according to claim 4, wherein the protection protrusion protrudes outward from the outer surface of the support wall with the mat seal cover locked to the cover locking portion and the protection protrusion arranged in the attachment hole.

\* \* \* \* \*